3,326,970
N-TRIHALOMETHYLTHIO N-(AMINOSULFONYL) CARBAMATES
Rudi F. W. Rätz and Philip M. Pivawer, Hamden, Conn., assignors to Olin Mathieson Chemical Corporation, New Haven, Conn., a corporation of Virginia
No Drawing. Filed Nov. 26, 1965, Ser. No. 510,097
7 Claims. (Cl. 260—481)

This invention relates to N-(trihalomethylthio) N-(aminosulfonyl) carbamates having the following general formula:

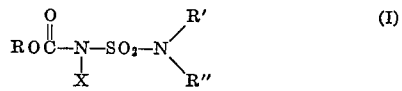

wherein R represents alkyl; R' and R" each represents hydrogen or alkyl; and X represents a trihalomethylthio moiety.

It has been found that the carbamates I are useful pesticides, and in accordance with this invention they are provided in high yield and purity by the reaction of selected alkyl aminosulfonyl carbamates with trihalomethylsulfenyl halides. Thus the preparation of the derivatives I herein is represented by the following equation wherein Y is a halogen atom:

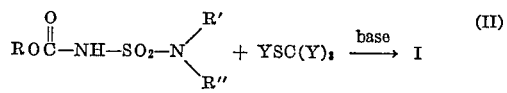

The alkyl aminosulfonyl carbamates II which are used as intermediates in the practice of this invention are readily available by the reaction of ammonia and primary and secondary amines with alkyl N-halosulfonyl carbamates. For instance, preparation of compounds having the Formula II has been described by Graf in Ber. 96, 56–67 (1963); C.A. 58, 8939–41 (1963).

Any of the derivatives II may be employed in preparing the substituted carbamates of this invention. However, preferred embodiments are provided when the alkyl groups previously represented (i.e., R, R', and R") contain 1–8 carbon atoms. Similarly, any of the known trihalomethylsulfenyl halides may be reacted with the compounds II to provide carbamates included in the general Formula I. For instance, tribromomethylsulfenyl bromide, trifluoromethylsulfenyl chloride, and difluorochloromethylsulfenyl chloride may be employed as starting reactants. Preferably, however, trichloromethylsulfenyl chloride and dichlorofluoromethylsulfenyl chloride are utilized as intermediates in the practice in this invention.

Reaction of the alkyl aminosulfonyl carbamates with the trihalomethylsulfenyl halides is carried out in the presence of an acid acceptor and preferably while employing an inert diluent. A number of basic materials can be utilized as the required acid acceptor. For instance, alkali metal hydroxides are conveniently employed in the preparation of the carbamates I. Among other basic materials which may be suitably employed are the alkaline earth metal hydroxides, tertiary amines such as triethylamine and the like, and alkoxides such as sodium methoxide. Among the diluents which can be advantageously utilized in the preparations are water, the lower aliphatic alcohols and tetrahydrofuran. The reactions are generally carried out at a reaction temperature range of about 0°–60° C., and preferably at room temperature or lower. Isolation of the products is performed by using conventional extraction and filtration procedures followed by a recrystallization step for highest purity.

The N-(trihalomethylthio) N-(aminosulfonyl) carbamates of this invention are biologically active compounds. They are useful as pesticides particularly as fungicides, and it has been found that they are effective both as soil and foliar fungicides against a variety of plant pathogenic fungi. The carbamates are also effective nematocides especially for controlling the root-knot nematode Meloidogyne incognita, an obligate plant parasite harmful to tomato and cucumber plants.

The following examples will serve to illustrate the preparation of several of the carbamates I of this invention.

Example 1

N-(dimethylaminosulfonyl) carbamic acid, methyl ester (5.46 g., 0.03 mole) was dissolved in 20 ml. of tetrahydrofuran, and 1.2 g. (0.03 mole) of sodium hydroxide in 15 ml. of water was added. The solution was cooled to 5° C. and 5.58 g. (0.03 mole) of trichloromethylsulfenyl chloride was added rapidly. The solution was stirred for 5 minutes, then extracted with four 40 ml. portions of ether. The combined ether solutions were extracted with three 20 ml. portions of water and the ether phase dried over magnesium sulfate. After filtration, the ether was evaporated and on standing in the ice box a precipitate formed. The crude solid was recrystallized from carbon tetrachloride to give 5.6 g. (54%) of a crystalline product. This material was recrystallized again from carbon tetrachloride followed by a recrystallization from a heptane-chloroform mixture to provide 1.75 g. of crystals melting at 84°–86° C. The following analytical data revealed that N-(trichloromethylthio) N-(dimethylaminosulfonyl) carbamic acid, methyl ester had been obtained.

Analysis.—Calcd. for $C_5H_9Cl_3N_2S_2O_4$: C, 18.13; H, 2.72; Cl, 32.02; N, 8.46; S, 19.34. Found: C, 18.36; H, 2.85; Cl, 32.00; N, 8.34; S, 19.36.

Example 2

N-(methylaminosulfonyl) carbamic acid, methyl ester (8.4 g., 0.05 mole) was dissolved in 25 ml. of water containing 2.0 g. (0.05 mole) of sodium hydroxide. The solution was cooled to 5° C. and 9.3 g. (0.05 mole) of trichloromethylsulfenyl chloride was added. Two layers separated and after 15 minutes of stirring, 15 ml. of isopropyl alcohol were added to promote homogeneity. After 10 more minutes a white solid formed which was filtered and dried to give 15.5 g. (98%) of a crystalline product. This material was recrystallized from a heptane-chloroform mixture to provide 11.5 g. of a crystalline material melting at 101°–103° C. The following analytical data revealed that N-(trichloromethylthio) N-(methylaminosulfonyl) carbamic acid, methyl ester had been obtained.

Analysis.—Calcd. for $C_4H_7Cl_3N_2S_2O_4$: C, 15.15; H, 2.21; Cl, 33.44; N, 8.83; S, 20.19. Found: C, 15.45; H, 2.39; Cl, 33.6; N, 8.80; S, 20.26.

Example 3

N-(methylaminosulfonyl) carbamic acid, methyl ester (1.68 g., 0.01 mole) was dissolved in 5 ml. of water, and 0.4 g. (0.01 mole) of sodium hydroxide was added along with 4 ml. of tetrahydrofuran. This was followed by 1.68 g. (0.01 mole) of dichlorofluoromethanesulfenyl chloride. An oily layer separated and the water layer was decanted and then extracted with two 20 ml. portions of ether. The ether extracts were combined with the oily layer and this solution was extracted with cold water and then dried over magnesium sulfate. After filtration, the ether was evaporated from the filtrate and an oily residue obtained which solidified slowly on standing in a refrigerator. This solid was recrystallized from a heptanechloroform solution to provide 2.0 g. (67%) of crude product which upon a second recrystallization from the same solvent combination provided crystals melting at 48°–52° C. The following analytical data revealed that N-(dichlorofluoromethylthio) N-(methylaminosulfonyl) carbamic acid, methyl ester had been obtained.

*Analysis.*—Calcd. for $C_4H_7Cl_2FN_2O_4S_2$: C, 15.95; H, 2.33; Cl, 23.60; F, 6.31; N, 9.30; S, 21.26. Found: C, 16.48; H, 2.90; Cl, 22.20; F, 5.55; N, 10.08; S, 21.41.

What is claimed is:

1. N-substituted N-(aminosulfonyl) carbamates having the formula:

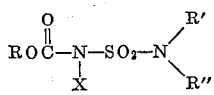

wherein R represents alkyl of 1 to 8 carbon atoms; R' and R'' each independently represents hydrogen or alkyl of 1 to 8 carbon atoms; and X represents a trichloromethylthio or dichlorofluoromethylthio moiety.

2. The compounds of claim 1 wherein R, R' and R'' represent alkyl of 1 to 8 carbon atoms and X represents a trichloromethylthio moiety.

3. The compound of claim 2 having the name N-(trichloromethylthio) N-(dimethylaminosulfonyl) carbamic acid, methyl ester.

4. The compounds of claim 1 wherein R and R' represent alkyl of 1 to 8 carbon atoms, R'' is hydrogen and X represents a trichloromethylthio moiety.

5. The compound of claim 4 having the name N-(trichloromethylthio) N-(methylaminosulfonyl) carbamic acid, methyl ester.

6. The compounds of claim 1 wherein R and R' represent alkyl of 1 to 8 carbon atoms, R'' is hydrogen and X represents a dichlorofluoromethylthio moiety.

7. The compound of claim 6 having the name N-(dichlorofluoromethylthio)-N - (methylaminosulfonyl) carbamic acid, methyl ester.

References Cited

FOREIGN PATENTS 622,214  3/1963  Belgium.

OTHER REFERENCES

Degering et al.: J. Am. Pharm Assoc., vol. 39, pp. 624–627 (1950).

Graf: Ber. Dent. Chem., vol. 96, pp. 56 to 67 (1963).

LORRAINE A. WEINBERGER, *Primary Examiner.*

I. PELLMAN, *Assistant Examiner.*